Dec. 22, 1942.  H. E. TUCKER  2,305,914
RAILWAY TRUCK
Filed Nov. 29, 1940  2 Sheets-Sheet 1

INVENTOR.
Herbert E. Tucker
BY Mann, Brown & Co.
ATTYS.

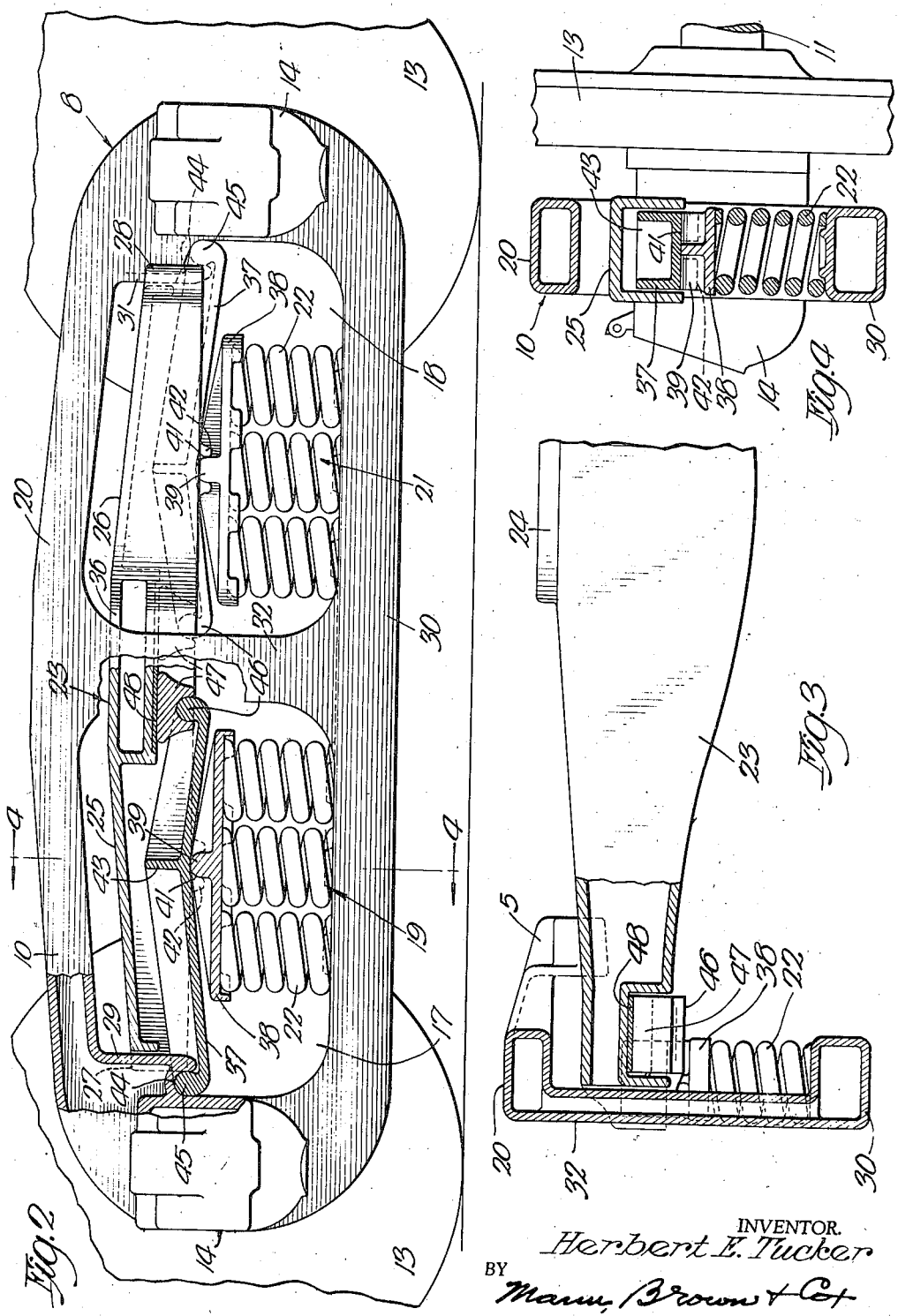

Patented Dec. 22, 1942

2,305,914

UNITED STATES PATENT OFFICE 2,305,914

RAILWAY TRUCK

Herbert E. Tucker, Chicago, Ill., assignor to James R. Cardwell, Chicago, Ill.

Application November 29, 1940, Serial No. 367,753

15 Claims. (Cl. 105—197.2)

This invention relates to railway trucks, and more particularly to the construction of the trucks and to the spring-supporting mechanisms therefor.

The principal object of the invention is the provision of a truck having a novel construction, together with new and improved means for resiliently supporting the car body from the truck axles.

Another object of the invention is the provision of new and improved spring-supporting mechanism for transporting the car body in such a manner that light and medium loads will be transported much more resiliently than on the conventional trucks having the usual spring assemblies mounted thereon.

A further object of the invention is the provision of a new and improved spring mechanism that is so constructed that its natural period of vibration or frequency will be materially reduced over the conventional spring assemblies, with the result that the corresponding speed of the car will be so low that harmonic action of the spring assemblies will in practice be a negligible quantity.

A further object of the invention is the provision of a new and improved truck arrangement that is simple in construction, easily assembled, efficient in operation, and one that is conducive to soft riding under all load conditions.

Other and further objects and advantages of the invention will appear from the following description taken in connection with the accompanying drawings, in which Fig. 1 is a plan view of a truck showing the invention positioned thereon, with parts in section and parts broken away;

Fig. 2 is a side elevation of the construction shown in Fig. 1, with parts in section and parts broken away;

Fig. 3 is a section on the line 3—3 of Fig. 1, with parts broken away; and

Fig. 4 is a section on the line 4—4 of Fig. 2, with parts broken away.

Figure 1:
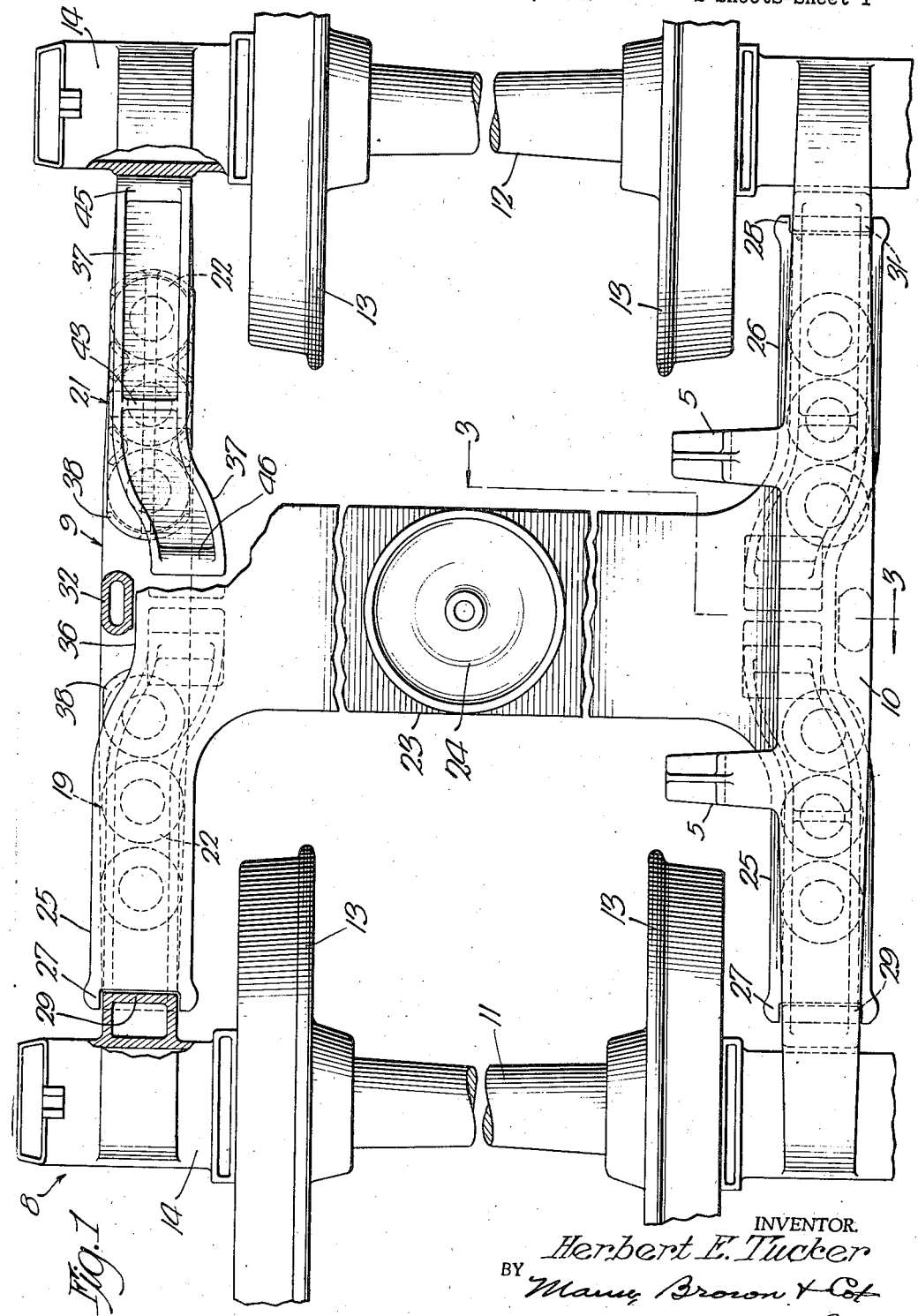

With the conventional springs for supporting the car body of railway cars, especially of freight cars, light or partially loaded cars do not ride softly because the springs must necessarily be stiff in order to support the maximum loads to which they are subjected. Consequently, where the spring assemblies support the load directly, the light loads compress the springs to a very limited extent and as a result the natural period of vibration of the springs under light loads is much higher than where the springs are loaded. In other words, the frequency of springs decreases as the load increases, and as a result heavy loads ride easier or softer than light loads. That is, where the frequency of the spring is low the rinding is softer than where it is high. For instance, on passenger automobiles springs that vibrate a much higher rate than ninety (90) cycles per minutes are uncomfortable, and hence most springs used on motor vehicles have a frequency of ninety (90) cycles or less per minute.

It is well known that cars, in running over the joints of the rails on railroads, will be given an impetus which, being transmitted to the springs, will cause vibration of the same. Now, if these impetuses be regular and their frequency correspond to the natural vibrations of the springs, the intensity of the vibration will build up to an objectionable extent. This is known as harmonic action of the spring assemblies. With the conventional empty freight car supported with conventional helical springs running over a track having 60 foot rails, the harmonic action of the springs occurs when the velocity is around 35 miles per hour.

The present invention seeks to so construct the spring suspension that the weight or load may move through a greater distance than the spring compression, whereby the frequency of the load or car vibration will be reduced over that of the load or car that is supported directly on the springs. This is accomplished by the mechanism that will now be described.

Referring to the drawings, the reference character 8 designates a truck comprising, in the form of construction shown, a pair of side frames 9 and 10, supported by a pair of axles 11, 12 (Fig. 1), having rigidly mounted thereon wheels 13 as is usual in such constructions. The ends of the axles are provided outwardly of the wheels with journal boxes 14 for supporting the side frames 9 and 10. In the form of the construction shown, these journal boxes are rigidly connected to the side frames 9 and 10 extending longitudinally of the truck. The side frames may be provided with integral brake supporting arms or brackets 5, Fig. 3, for supporting the brake mechanism, not shown.

Each of these side frames has an upper or compression member 20, and a lower or tension member 30, connected together at their central portion by a brace, strut or tie member 32. The space between the tension and compression members in front of the tie member 32 will be termed, for convenience of description, the front opening or front window opening 17, and the space at the rear of the tie member will be termed the rear opening or rear window opening 18. Within these openings are mounted the front spring assembly 19 and the rear spring assembly 21. While the end of the truck in Fig. 1, at the bottom of the sheet, will be referred to as the front end, it is understood that this is for convenience of identification only as the parts are duplicated at the opposite end of the truck and parts reversed, as clearly shown in said figure. These spring assemblies are seated on the lower or tension member 30 of the side frame, and each comprises a plurality of springs 22, as clearly shown in Fig. 2 of the drawings.

The truck bolster is shown at 23, and has a center bearing 24 of the usual construction. The outer ends of the bolster are bifurcated, i. e., each end has an arm 25 (Fig. 1) extending forwardly and another arm 26 extending rearwardly. The arms of the bolster are inverted channels, as shown in Fig. 4, for receiving the lever members, as will presently appear. The outer ends of these arms are provided with vertical channels 27 and 28, as shown in Fig. 1, which engage corresponding vertical guides 29 and 31 on the side frames adjacent the front and rear journal boxes, as shown more clearly in Figs. 1 and 2. These guides 29 and 31 may be considered as being on the journal boxes since they are integral therewith.

Each of the side frames is provided at its outer side with a vertical brace bar or tie member 32 (Figs. 1 and 2), which is integral with the upper or compression member 20 of the side frame, and at its lower end is integral with the lower or tension member 30 of the side frame. These tie members are at the ends of the bolster outwardly thereof, and are of a thickness much less than that of each side frame.

The arms 25 and 26 of the bolster extend around the tie or brace members 32, as shown more clearly in Fig. 1 of the drawings. In other words, the end of the bolster may be considered as being provided with a cut-out portion, as at 36, that is, the inner ends of the arms are offset inwardly to provide clearance about the braces or tie members for the ends of the bolster during its vertical movement.

Suitable means are provided for resiliently supporting the bolster from the spring assemblies 19 and 21 in such manner that the vertical or compressive movement of the springs will be much less than the vertical movement of the bolster, whereby with the same spring compression the bolster will have a greater amplitude of movement and hence a lower frequency, thus resulting in a more resilient or softer movement for the car than the conventional bolster which is usually supported directly on the springs. Any suitable mechanism may be employed for this purpose.

In the form of construction shown, which is for illustrative purposes only, a lever mechanism is employed. As illustrated, each spring assembly has associated therewith a single lever 37. Since the arrangement is the same for both spring assemblies at each side of the truck, only one need be described. The spring assemblies are each provided with a spring cap or spring plate 38, having an upwardly extending projection 39 thereon. This projection has its upper end rounded, as shown in Fig. 2, and engages in a corresponding concave recess 41, which is formed by the projections 42 extending downwardly from an intermediate portion of the lever 37, as shown in said figure.

The lever may be of any form, that shown being in the form of a channel having a reinforced rib 43 extending transversely between the flanges above the recess 41 (Fig. 2). These levers are movable within the channels of the bolster arms, as shown more clearly in Fig. 4. Each journal box at the ends of the side frames is provided at its inner side with a concave recess 44, which is adapted to receive a corresponding convex connecting or cross-member 45 extending between the two flanges of the outer end of the lever 37. This connection 44, 45, constitutes the fulcrum for the lever. The inner ends of the levers 37 support the truck bolster 23. The inner end of each lever is also provided with a convex connecting member 46 between the flanges of the lever, and is adapted to engage a corresponding recess in a sliding block 47 that slidably engages the under surface of the lower portion of the bolster 23. Preferably a wear plate 48 is inserted between the lower surface of the bolster and the side member 47, as shown more clearly in Fig. 2.

It will thus be seen that the lever is of the third class, in which the fulcrum is at 44, 45, the weight is at 46, 47, and the power is applied at 39, 41. As a result of this arrangement vertical movement of the bolster will cause a compression movement of the spring assembly, but the assembly will not move as far as the bolster. Consequently the load carried by the bolster will be supported with a softer spring effect, that is, the bolster will be more resiliently supported than it would be were the bolster seated directly on the spring plates 38. The ratio of the distance moved by the bolster and the spring assembly may be varied as desired by varying the point at which the power is applied. In other words, if the front spring assembly 19 be moved forwardly, the bolster will move through a still greater distance than will the spring assembly during the vibration of the parts. The point of power application 39, 41, may be varied, as required, by moving the spring assembly and changing levers so that the recess 41 is at the desired point to give the desired mechanical advantage. The slidable connection between the bolster 48 and the slide block 47 will permit this movement or will compensate therefor.

The block 47 will be held from movement longitudinally of the bolster by the lever 37, which in turn is prevented from lateral movement by the flanges of the bolster arms. The bolster in turn cannot move laterally of the side frames because the vertical grooves 27 of the outer ends of the bolster arms engage the vertical guides 29 on the side frames and prevent such movement. Furthermore, the bolster is limited in its longitudinal movement by the tie members 32, which engage the ends of the bolster when the bolster swings laterally.

The friction between the friction block 47 and the friction plate 48, as well as the friction between the joints at opposite ends of the lever 37, will resist any harmonic action of the spring assemblies that may tend to develop in the spring suspension system during the operation of the truck.

It is thought from the foregoing, taken in connection with the accompanying drawings, that the construction and operation of my device will be apparent to those skilled in the art and that changes in size, shape, proportion and detail may be made without departing from the spirit and scope of the appended claims.

I claim as my invention:

1. In combination, a plurality of axles, wheels rigidly mounted on said axles, journal boxes on the ends of said axles outwardly of said wheels, side frames rigidly mounted on said journal boxes, a bolster, a lever for each journal box having one end engaging the side frame at its outer end adjacent to a corresponding journal box and supporting a portion of said bolster at its inner end, a spring plate pivotally engaging said lever between the ends thereof, and spring means for supporting said plate from said side frame.

2. In combination, a pair of wheeled axles having journal boxes, side frames rigidly connected to said journal boxes at opposite ends of the axles, respectively, fulcrum projections on said journal boxes, levers having their outer ends engaging said projections, spring assemblies engaging said frames and intermediate portions of said levers, a truck bolster, and means for supporting said bolster from the inner ends of said levers.

3. In a truck frame, a plurality of wheeled axles having journal boxes thereon, side frames supported from said axles, a bolster between said frames, said bolster having forwardly and rearwardly extending arms at each end of said bolster slidably engaging portions of said frames for connecting said frames together and for holding said frames to a position normal to said bolster, levers engaging said journal boxes at their outer ends, spring assemblies supported on said side frames and engaging said levers between their ends, slide members slidably engaging beneath said bolster at opposite ends thereof, said members seated on the inner ends of said levers for supporting said bolster therefrom.

4. In a railway truck, a plurality of wheeled axles, journal boxes on said axles, side frames supported by said journal boxes, a truck bolster between said side frames and having forwardly and rearwardly extending arms at each end thereof, means movable with said journal boxes engaging the ends of said arms for holding said bolster substantially normal to said side frames, a lever pivotally connected to each journal box and extending along said arms toward said bolster, the inner ends of said levers being located beneath said bolster for supporting the same, and a spring assembly carried by said side frames beneath each lever and engaging the corresponding levers between the ends thereof for resiliently supporting any load carried by said bolster.

5. In a railway truck, a plurality of wheeled axles, journal boxes on said axles, side frames supported by said journal boxes, a truck bolster between said side frames and having forwardly and rearwardly extending arms at each end thereof, means movable with said journal boxes engaging the ends of said arms for holding said bolster substantially normal to said side frames, said arms being channels with the flanges extending downwardly, a lever pivotally connected to each journal box and extending along the adjacent arm within said channel and having its inner end beneath said bolster, a sliding block engaging the bottom face of said bolster and pivotally connected to the adjacent arm, and a spring assembly for each lever engaging the levers between their ends for resisting downward movement of said bolster.

6. In combination, a pair of wheeled axles having journal boxes on the ends thereof, side frames rigidly connected to said journal boxes, a bolster having forwardly and rearwardly extending arms having channels in the outer ends thereof for engaging guides carried by said journal boxes, and spring mechanism for supporting said bolster from said side frames and journal boxes, said mechanism comprising spring assemblies seated on said frames and lever members having their outer ends engaging corresponding journal boxes and their other ends engaging beneath said bolster, said spring assemblies each engaging beneath a corresponding lever for supporting the same, said assemblies engaging said levers between their pivoted ends whereby the natural frequency of said assemblies will be materially reduced for causing softer riding for said bolster.

7. In combination, a pair of wheeled axles having journal boxes on the ends thereof, side frames rigidly connected to said journal boxes, a bolster having forwardly and rearwardly extending arms having channels in the outer ends thereof for engaging guides carried by said journal boxes, said arms having channels on their under sides, and spring mechanism for supporting said bolster from said side frames and journal boxes, said mechanism comprising spring assemblies and a lever of the third class for each assembly biased upwardly by the corresponding assembly and having a fulcrum on said frame and engaging beneath said bolster for supporting the same whereby said bolster, during travel, will have a greater movement than the compressive movement of said spring, whereby soft riding is provided for light loads carried on said bolster, said levers being positioned within said last-named channels.

8. In a railway truck, a plurality of wheeled axles, journal boxes on the outer ends of said axles, side frames rigid with said journal boxes, each of said side frames having upper and lower members spaced apart, a bolster, spring mechanism for supporting said bolster from said frame, said mechanism comprising a lever for each journal box fulcrumed at one end on said journal box between said upper and lower members, and means on the opposite end of said lever frictionally engaging said bolster for preventing harmonic movement of said spring mechanism, said spring mechanism engaging said lever for resiliently supporting said bolster from said side frames.

9. In a railway truck, a pair of wheeled axles, a journal box for each end of each axle, side frames integral with said journal boxes at opposite sides of the truck, vertical guides on said journal boxes, a bolster between said side frames and having forwardly and rearwardly extending arms for slidably engaging said guides, a lever for each journal box fulcrumed on the box, the opposite ends of said levers supporting said bolster, a spring assembly beneath each lever and the adjacent frame for resiliently supporting said levers, and friction means movable by said levers and frictionally engaging said bolster for preventing harmonic action of the spring assemblies.

10. In a truck, a plurality of wheeled axles each having a journal box on each end thereof with upwardly extending guides, side frames rigidly connected to said journal boxes at opposite sides of the truck, a bolster having forwardly and rearwardly extending channel arms at each end thereof, said arms being inverted and U-shaped in cross-section and slidably engaging said guides, a lever fulcrumed on each journal box and extending into the channel of the corresponding bolster arm and having its opposite end engaging beneath said bolster for supporting the same, and a spring assembly beneath the intermediate portion of each lever for supporting the same.

11. In a truck for a railway car, a pair of axles having wheels thereon and a journal box on each end of each axle outwardly of the wheels, a side frame at each side of the truck rigidly connected to the corresponding journal boxes, each of said side frames having an upper compression member and a lower tension member and a strut between the outer portions of said members intermediate the ends thereof and forming window openings at opposite sides of said strut, a bolster having arms at each end thereof curved around said strut and having their ends offset outwardly in the plane of said frame, said arms having recesses in the lower portions thereof, spring mechanism for supporting said bolster from said frame, said mechanism comprising springs, and a lever of the third class wherein the bolster is the weight and the springs are the power under all load conditions, said lever extending longitudinally of the corresponding arm and extending into said recess.

12. In a railway truck, a pair of wheeled axles, side frames carried by said axles, each side frame having an upper compression member and a lower tension member, a vertically movable bolster having forwardly and rearwardly extending arms at each end thereof between said members, spring mechanism beneath each of said arms, said mechanisms including spring biased levers for supporting said bolster from said side frames, and friction means frictionally engaging said bolster, and movable by said levers for frictionally resisting the free vibration of said spring mechanism.

13. In a railway truck, a pair of wheeled axles, side frames carried by said axles, a vertically movable bolster having a portion thereof extending transversely to said side frames, spring mechanism including a spring-pressed lever at each side of said bolster at each end thereof extending longitudinally of said frames away from said bolster for supporting said bolster, friction members carried by the inner ends of said levers for frictionally engaging said bolster for supporting the same and for preventing harmonic vibration of said spring mechanism under all load conditions.

14. In a truck for a railway car, a pair of axles having wheels thereon and a journal box on each end of each axle outwardly of the wheels, a side frame at each side of the truck rigidly connected to the corresponding journal boxes, a bolster, spring mechanism for supporting said bolster from said frame, said mechanism comprising springs, a lever of the third class extending transversely of said axles, said lever being within the plane of the corresponding side frame, and a fulcrum on said side frame wherein the bolster is the weight, the springs the power, and the side frame the fulcrum, the parts being so constucted and arranged that said weight is applied to the outermost portion only of one end of said lever under all load conditions, whereby the effective length of said lever remains substantially constant during use.

15. In a truck for a railway car, a pair of axles having wheels thereon and a journal box on each end of each axle outwardly of the wheels, a side frame at each side of the truck rigidly connected to the corresponding journal boxes, a bolster comprising a body portion extending transversely of said side frames and having arms extending longitudinally of said frames, spring mechanism beneath each of said arms for supporting said bolster from said frames, each of said mechanisms being so constructed and arranged that said bolster will move a greater distance than the deflection of said springs when said springs are depressed by a load applied to said bolster under all load conditions, comprising a lever beneath each arm having one end fulcrumed on said frame and having its opposite end beneath said bolster, a spring assembly for supporting each lever, and means on said assembly for pivotally engaging the central portion of said lever for supporting said lever and bolster from said assembly.

HERBERT E. TUCKER.